United States Patent [19]

Hansen et al.

[11] 4,445,677

[45] May 1, 1984

[54] CLAMPING APPARATUS FOR PLASTIC PIPE

[75] Inventors: Bent J. Hansen, Caledon East; Clifford F. Thompson, Weston, both of Canada

[73] Assignee: Cliffside Pipelayers, Scarborough, Canada

[21] Appl. No.: 358,359

[22] Filed: Mar. 15, 1982

[30] Foreign Application Priority Data

Feb. 1, 1982 [CA] Canada ................................. 395274

[51] Int. Cl.³ ............................................. B25B 1/20
[52] U.S. Cl. ...................................... 269/41; 269/228;
    156/499; 156/556; 156/580; 100/283
[58] Field of Search ............ 156/499, 556, 580, 583.1;
    100/293, 283, 286; 29/267, 281.1, 281.3, 251;
    269/228, 41

[56] References Cited

U.S. PATENT DOCUMENTS

| | | | |
|---|---|---|---|
| 3,043,175 | 7/1962 | Gallob | 100/283 X |
| 3,311,367 | 3/1967 | Sendoykas | 269/228 X |
| 3,743,566 | 7/1973 | Louthan et al. | 156/556 X |
| 3,917,497 | 11/1975 | Stickler | 156/580 X |
| 3,966,528 | 6/1976 | Christie | 156/499 X |
| 4,088,072 | 5/1978 | Wittmeier | 100/283 |
| 4,092,205 | 5/1978 | Mieszczak | 156/556 X |
| 4,157,174 | 6/1979 | Hickman et al. | 269/901 X |

FOREIGN PATENT DOCUMENTS

| | | | |
|---|---|---|---|
| 57-46859 | 3/1982 | Japan | 156/556 |
| 1545516 | 5/1979 | United Kingdom | 156/556 |

*Primary Examiner*—Frederick R. Schmidt
*Assistant Examiner*—Steven P. Schad
*Attorney, Agent, or Firm*—Sim & McBurney

[57] ABSTRACT

An apparatus for clamping a plastic fitting against a plastic pipe and for holding them together with a predetermined clamping force includes a carriage and guide means for guiding the carriage in vertical motion above a fixed pipe support portion. A frame portion is fixed with respect to the pipe support portion, and first and second toggle links are pivoted to the carriage, to the frame portion and to each other in such a way that the links can achieve an aligned position in which the carriage is in its lowermost location. A mechanical interference means is provided to prevent the toggle links from going significantly past the dead center position represented by the alignment. Means are connected to the carriage for holding the plastic fitting, and lever means are provided for rotating one of the toggle links.

8 Claims, 7 Drawing Figures

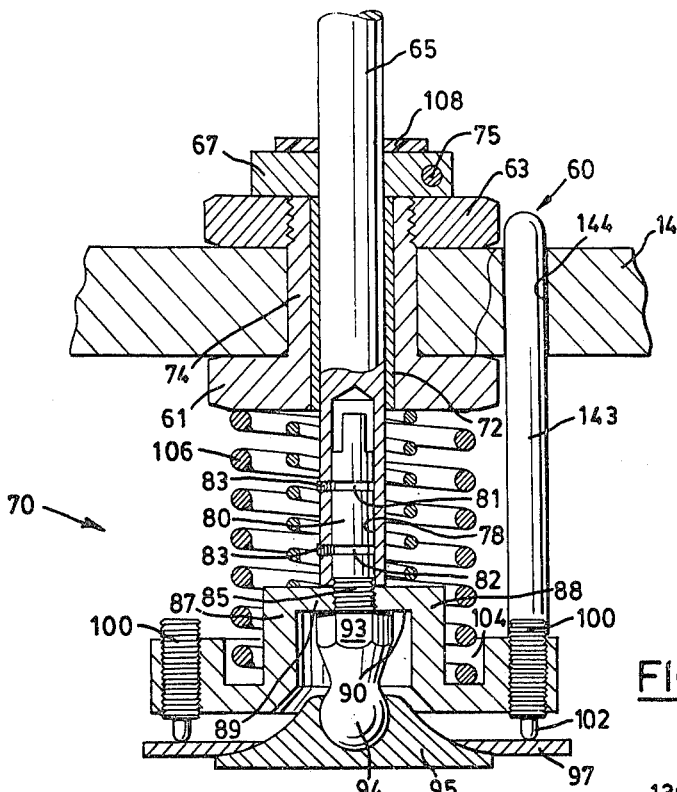
FIG. 3
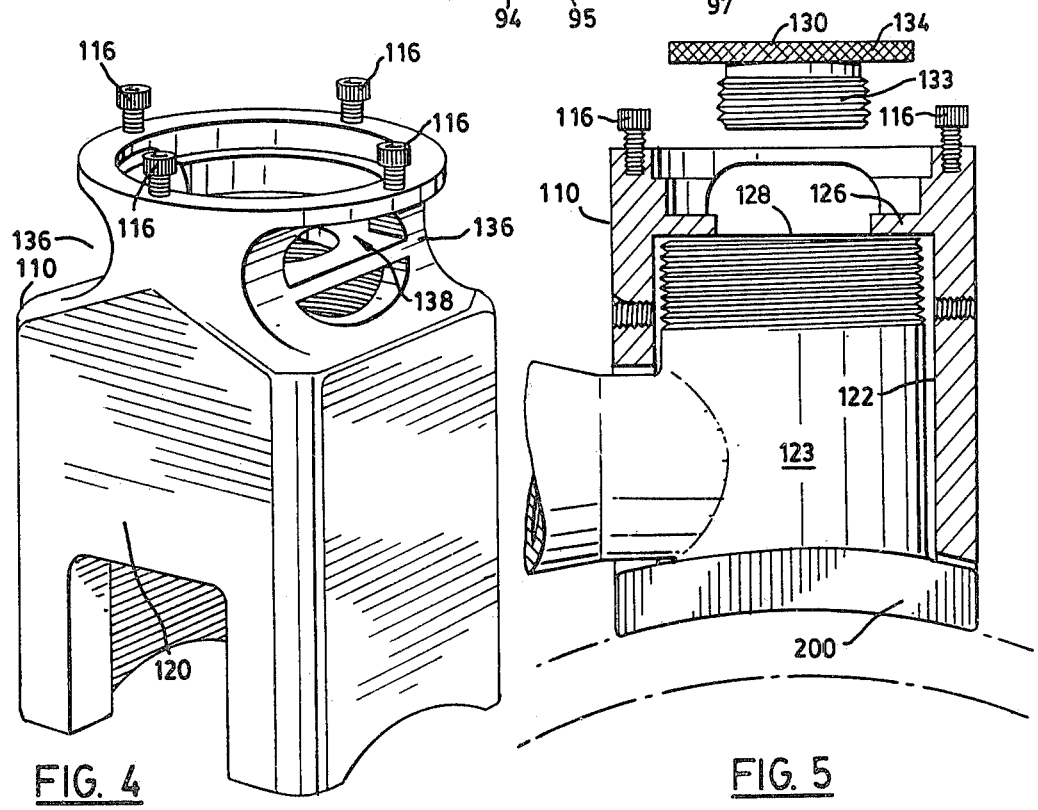
FIG. 4
FIG. 5

CLAMPING APPARATUS FOR PLASTIC PIPE

This invention relates generally to the installation and connecting of plastic pipe, and has to do particularly with a clamping or holding apparatus which is adapted to maintain a plastic fitting against a plastic pipe, after the contacting portions have been appropriately heated, and to hold these parts together at a predetermined clamping force.

REFERENCE TO PRIOR ART

The present invention constitutes an improvement over U.S. Pat. No. 3,743,566, issued July 3, 1973, and over U.S. Pat. No. 4,092,205, issued May 30, 1978.

BACKGROUND OF THIS INVENTION

There are many problems which surround the laying of plastic pipe in the ground, and particularly the connection of house service lines to a main. Natural gas services now conventionally utilize thermoplastic pipe. When a new house or other building service is to be attached, a trench is dug from the building to the main where the attachment is to take place, and a T-connection or similar fitting is connected to the main to feed the service line. The attachment of the T-fitting often has to be done in adverse conditions. Firstly the connection must be made at the bottom of a trench, which may be dark and difficult of access. In winter, the workman would typically wear gloves, and would be unwilling to remove the gloves for certain fine operations which must be done manually. Because of the cramped quarters at the bottom of the trench, it is difficult for the installer to ascertain precisely the degree of pressure that must be held both for the heating step and for the welding step. With time, experience teaches the installer how to carry out these operations, but the inexperienced workman is often not able to complete the installation job in a satisfactory manner.

GENERAL DESCRIPTION OF THIS INVENTION

Accordingly, this invention provides a clamping apparatus for plastic pipe of the kind used in natural gas services, which is easily manipulated, light, and able to be used even with gloves on. Moreover, the clamping apparatus as set forth herein is adapted to apply a predetermined compressive force which is calculated to achieve the optimum weld between the T-connection and the main.

More particularly, this invention provides an apparatus for clamping a plastic fitting against a plastic pipe and for holding them together with a predetermined clamping force. The apparatus comprises a carriage and guide means for guiding the carriage in vertical motion. A fixed pipe support portion is located below the carriage, and a frame portion is fixed with respect to the pipe support portion. A first toggle link is pivoted to the carriage at a first axis, and a second toggle link is pivoted to the frame portion at a second axis, the two toggle links being pivoted to each other at a third axis. Means are provided to prevent the toggle links from going significantly past a dead center position in which the three axis are aligned and the carriage is in its lowermost position. Further means connected to the carriage are for holding the plastic fitting, and lever means is provided for rotating one of said toggle links.

In a preferred embodiment, the frame portion is located above the carriage.

GENERAL DESCRIPTION OF THE DRAWINGS

One embodiment of this invention is illustrated in the accompanying drawings, in which like numerals denote like parts throughout the several views, and in which:

FIG. 3 is vertical sectional view taken at the line 3—3 in FIG. 1;

FIG. 4 is a perspective view of a fitting holder adapted for use with the clamping apparatus shown in FIG. 1;

FIG. 5 is a sectional view through the member shown in FIG. 4, illustrating a T-fitting within the member.

DETAILED DESCRIPTION OF THE DRAWINGS

Figure 1:
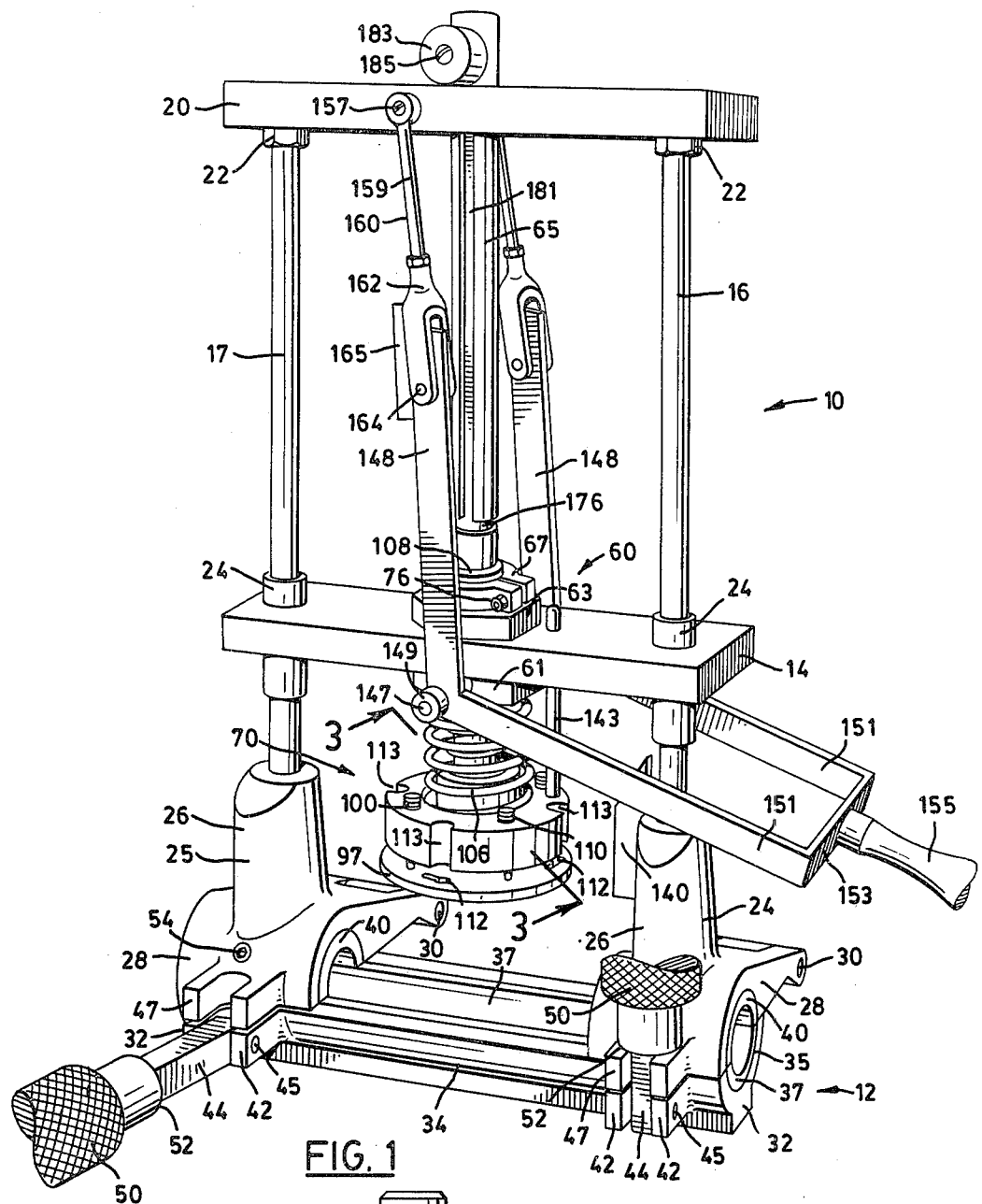
FIG. 1 is a perspective view of a clamping apparatus constructed in accordance with this invention.

Attention is first directed to FIG. 1, in which a clamping apparatus generally shown at the numeral 10 is seen to include a pipe support portion shown generally at 12, a vertically moveable carriage 14, and guide means for guiding the carriage in vertical motion. The guide means are seen to include two vertical cylindrical rods 16 and 17 in spaced-apart relation fixed with respect to the pipe support portion 12. At their upper ends, the rods 16 and 17 are affixed to a frame portion 20, which can be seen in FIG. 1 to be in the form of an elongated, rectangular, horizontal member. The rods 16 and 17 are threaded at their upper ends, and are screwed into suitably threaded, tapped bores in the member 20, with lock nuts 22 securing the rods 16 and 17 into place with respect to the member 20. The carriage 14 is also in the form of an elongate horizontal bar member of rectangular section, and is provided with cylindrical brass bushings 24 through which the rods 16 and 17 easily slide. The bushings 24 thus act as guides for the vertical motion of the carriage 14.

The lower ends of the guide rods 16 and 17 are firmly mounted in the upper halves of two clamping hinges 24 and 25. Each clamping hinge 24, 25 has an upstanding boss 26 which is integral with an upper hinge portion 28, the latter being hinged at a hinge axis 30 to a lower hinge portion 32. The lower hinge portions 32 are, in fact, two ends of a unitary pipe supporting portion 34 which defines a longitudinal, semi-cylindrical trough of which the outline can be seen at the right identified by the numeral 35. In the embodiment shown in FIG. 1, a liner 37 is provided in the trough 35, in order to adapt the apparatus to a smaller pipe than that which would exactly fit into the semi-cylindrical trough 35. As can be seen in FIG. 1, the liner 37 extends the full length of the pipe supporting portion 34. The upper hinge portions 28 also have inserts 40, which complete the semi-cylindrical inside surface of the insert 37. By removing the inserts 37 and 40, the lower part 12 of the apparatus becomes suitable for larger diameter pipe. Since the upper hinge portions 28 are hingedly connected to the lower hinge portions 32 (the latter being integral with each other), the pipe clamp thereby defined is capable of being opened up, simply by swiveling the lower hinge portions 32 about the hinge axis 30. The pipe supporting portion 34 (constituting the two lower hinge portions 32) has two pairs of projecting flanges 42, in each of which a bar 44 is pivotally mounted about a pivot axis 45. Each of the upper hinge portions 28 also defines a pair of flanges 47 between which the respective bars 44 are adapted to swing. At the left in FIG. 1, the bar 44 is shown swung downwardly away from the flanges 47, whereas at the right in FIG. 1, the bar 44 is shown in the upright position, extending between the flanges 47. Each bar 44 is integral with a threaded shaft (not seen) upon which a two stage knurled cylinder 50 is threaded. By rotating the knurled cylinder 50, its "lower" shoulder 52 can be brought to bear downwardly against the top of the respective pair of flanges 47, thus tightening the pipe clamp portion 12 onto a pipe of the appropriate size.

The inserts 40 are held in place by Allen screws 54 passing through the upper hinge portion body.

Located centrally of the carriage 14 is an assembly shown generally at the numeral 60, which includes an upright cylindrical member 74 (see FIG. 3) passing snugly through a suitably sized bore in the middle of the carriage 14. The cylindrical member 74 is integral at the bottom with a hex nut portion 61 which extends outwardly beyond the cylindrical member, and is adapted to bear against the underside of the carriage 14. The cylindrical member is externally threaded at its upper end, and receives a hex nut 63, so that between them, the hex portion 61 and the hex nut 63 bear compressively against the lower and upper surfaces, respectively, of the carriage 14. The cylindrical member 74 has an internal brass sleeve 72, constituting a cylindrical slideway in which a cylindrical shaft 65 is adapted to reciprocate. The degree of reciprocation of the shaft 65, however, is limited due to the fact that it supports a penannular clamp 67 above the carriage 14, the clamp 67 limiting the downward movement of the shaft 65 with respect to the carriage 14, and due to the fact that the shaft 65 projects only a short distance below the hex portion 61 previously described, and has at its lower end an assembly shown generally at the numeral 70, the assembly 70 being such as to prevent the shaft 65 from being withdrawn upwardly out of engagement with the carriage 14.

Attention is now directed to FIG. 3 which illustrates in section both assemblies 60 and 70. In FIG. 3, the shaft 65 is shown extending downwardly through the brass sleeve 72 located within the upstanding cylindrical portion 74 which is integral with the hex portion 61. The penannular clamp 67 is seen to be located above the hex nut 63. The sectioned shaft 75 is that of the lock screw 76 seen in FIG. 1, which tightens the clamp 67 together.

At the bottom of the shaft 65 is a hollow cylindrical bore 78, in which a stub shaft 80 is received. The stub shaft 80 has two annular galaries 81 and 82 which are adapted to receive the inner ends of two lock screws 83 passing through suitably tapped bores in the side wall of the shaft 65. The stub shaft 80 has an integral downwardly extending threaded shank 85, which passes through a suitably dimensioned bore in a top hat member 87. As can be seen in FIG. 3, the top hat member 87 includes an upstanding portion 88 having a top wall 89 through which the bore for the shank 85 passes. The shank extends below the upper inner surface 90 of the upstanding portion 88, and is engaged by the hex nut portion 93 of a ball joint member 94, on which a floating washer member 95 pivots. Welded or otherwise secured to the floating washer member 95 is an annular flange 97. Because of the ball joint member 94, the annular flange 97 can change the angulation of its plane with respect to the shaft 65. Means are provided which tend to keep the annular washer member 97 in a plane perpendicular to the axis of the shaft 65. More specifically, this means includes four spring plungers 100 (two of which are visible in FIG. 3, three in FIG. 1). Each spring plunger consists of a threaded shaft from the bottom of which projects a spring-loaded button 102. The spring loading pushes downwardly on the button 102, and as can be seen in FIG. 3, the buttons of the spring plunger bear downwardly and equally against the upper surface of the annular flange 97. Thus, the annular flange 97 is able to change its plane relative to the axis of the shaft 65, but can do so only by depressing one or more of the buttons 102 of the spring plungers 100.

The top hat member 87 defines, around the portion 88, an annular recess 104 which receives one end of a first compression coil spring 106. The upper end of the spring 106 bears against the bottom surface of the hex portion 61, and thus the effect of the spring 106 is to force the shaft 65 and the assembly 70 to their lowermost position permitted by the position of the clamp 67. A second compression coil spring 107 is provided inside the first spring 106.

Upward pressure on the bottom of the shaft 65 will compress the springs 106 and 107, and raise the clamp 67 upwardly off the hex nut 63. In FIGS. 1 and 3 there is shown an annular washer 108, which surrounds the shaft 65 and sits loosely on top of the clamp 67. The purpose of the washer 108 is to provide a buffer between the clamp 67 and the underside of the frame portion 20, when the carriage 14 attains the upper end of its travel along the rods 16 and 17.

FIG. 4 shows a holder 110 for a thermoplastic fitting, which is adapted to be releasably connected to the annular flange 97. The annular flange contains four key-shaped apertures 112 (see FIG. 1) which are at 90° intervals, and which are adapted to be aligned with four recesses 113 around the outside of the top hat member 87. The annular flange 97 can be swivelled with respect to the top hat member 87.

The holder 110 shown in FIG. 4 has four upstanding machine screws 116, also arranged at 90° intervals, the machine screws having heads adapted to pass through the large portion of the respective apertures 112 in the annular flange. In order to connect the holder 110 to the annular flange 97, the heads of the machine screws 116 are passed through the large part of the openings 112, and then the annular flange is rotated in the counter-clockwise direction as seen from above, in order to bring the small portion of the key-shaped openings into registry with the machine screws 116. The heads of the machine screws 116 are too large to pass through the small portion of the key-shaped openings 112. The machine screws 116 can then be tightened down to firmly secure the holder 110 to the annular flange 117.

As can be seen in FIGS. 4 and 5, the holder 110 includes a lower body 120 which is substantially rectangular in horizontal section, and has an internal bore 122 adapted to receive the thermoplastic fitting 123. The holder 110 internally defines an annular flange 126 against which the upper end 128 of the fitting 123 is adapted to be tightened. The tightening takes place by the use of a locking nut 130, shown in spaced relation above the holder 110 in FIG. 5. The upper end of the fitting 123 is internally threaded (not seen in the Figure) and the locking nut 130 has a downwardly projecting threaded shank 133, which is adapted to engage the internal threads of a bore in the upper end of the fitting 123. The locking nut 130 also has a knurled flange 134, by which it can be manually turned. In order to have access to the flange 134 when the locking nut 130 is located within the top portion of the holder 110, the latter has two cut-away portions 136, the cut-aways breaking into the internal bore 122 of the holder 110. Thus, the outer edge of the knurled flange 134 is accessible at the location marked in FIG. 4 by the numeral 138.

Returning briefly to FIG. 1, the rightward upstanding box 126 has affixed to its inner or leftward region a knife-edge member 140, adapted to guide a conventional heating element used to soften the thermoplastic material of both the main pipe and the fitting which is to be attached thereto.

In FIGS. 1 and 3 there is shown an indication pin 143, which is screwed firmly into the top hat member 88, and projects upwardly through an opening 144 through the carriage 14. It will be appreciated that, as the top hat member moves upwardly with respect to the carriage 14, the pin 143 rises through the bore 144. The pin 143 has one or more markings on it, to allow the user to determine readily the degree of pressure being exerted by the spring 106, i.e. the pressure with which the assembly 70, shown at the bottom of FIG. 3, is exerting downward pressure through the intermediary of the holder 110.

Figure 6:
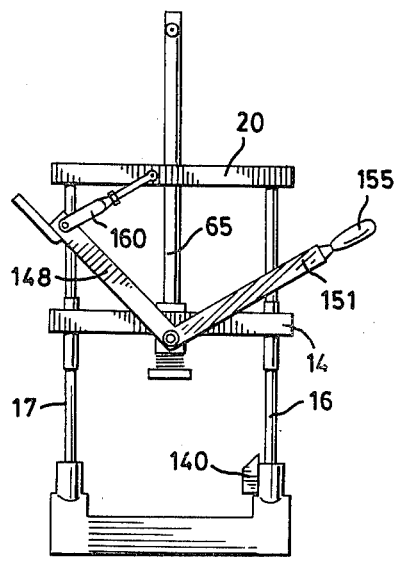
FIG. 6 is a simplified elevational view of the apparatus of FIG. 1, in a different position.

Reference is now made to FIGS. 1 and 6, for a description of the linkage and leverage system utilized to control the position of the carriage 14. Pivoted at the location 147 to the hex portion 61, the latter being fixed with respect to the carriage 14, is a pair of first toggle links 148. Extendng rightwardly at an obtuse angle with respect to the first toggle links 148 are a pair of lever members 151, which are joined at the outer or rightward end by a crosspiece 153. Extending rightwardly from and securely fixed to the crosspiece 153 is a handle 155. Each lever member 151 is securely welded with respect to its respective first toggle link 148, and forms a kind of bell-crank having an angle slightly greater than 90°. Where each lever member 151 joins its respective toggle link 148, there is provided a bore through which the shoulder of a shouldered machine screw 149 passes. The machine screw 149 is threaded into a tapped bore in the hex portion 61, and the shoulder is long enough axially to avoid binding the combination of the lever member 151 and the toggle link 148. Thus, free pivoting action of the lever member 151 and toggle link 148 is possible about the axis represented by the numeral 147.

Pivoted at the location 157 to the member 20 are a pair of second toggle links 159 each of which include a rod 160 threaded at the lower end and threadably engaged with a fork member 162, the fork member being pivotally connected at the numeral 164 with the upper end of the respective first toggle link 148. It will be understood that the structure seen at the near side of the apparatus is exactly duplicated on the far side with regard to the toggle links. Each toggle link 148 has an upstanding finger 165 which lies along the left side of the fork member 162, and which is thus in mechanical interference with the toggle link 160 when the links seek to rotate past a dead center position, which is that shown in FIG. 1, i.e. when they seek to rotate in such a way that the pivot axis 164 between the toggle links moves to the right as pictured in FIG. 1. In actual fact, the fingers 165 allow a slight movement past dead center position, so that the toggle links will lock in the slightly-past-dead-center position.

Looking at FIG. 6, it will be understood that, by grasping the handle 155 and raising it upwardly, a counter-clockwise torque is exerted on the toggle link 148, which then cooperates with the toggle link 160 to raise the carriage 14. Conversely, downward pressure on the handle 155 forcibly lowers the carriage 14.

Figure 7:
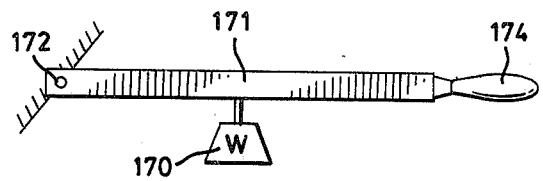
FIG. 7 is a schematic view of a lever, to illustrate a mechanical principle employed in this invention.

FIG. 7 shows an analogous structure to illustrate the way in which the particular construction of this apparatus allows a mechanical advantage to be obtained through the lever principle. The carriage 14 is compared to the weight 170 which is attached approximately midway of a lever 171, the latter being pivoted at 172. The handle 174 at the right is analogous to the handle 155. It can be appreciated that, with the weight 170 approximately midway of the lever 171, the upward force on the handle 174 need only be about half of the actual weight 170, in order to lift it up and move the lever in the counter-clockwise direction as pictured in FIG. 7. A similar advantage is obtained in FIG. 6, as will be evident by comparing the two structures. The same mechanical advantage arises when the carriage is moved forcibly downwards, and in particular, as the toggle links approach their aligned configuration, the amount of force that needs to be applied downwardly on the handle 155, for a given downward force at the shaft 65, decreases considerably.

Figure 2:
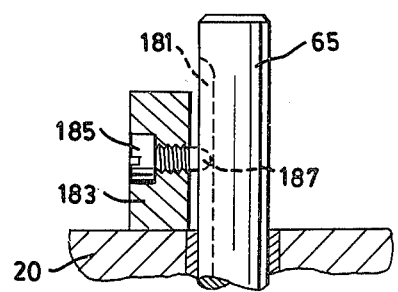
FIG. 2 is a sectional view taken through a portion of the upper central part of the apparatus shown in FIG. 1.

Attention is lastly directed to FIGS. 1 and 2, for a description of the alignment and locking capability for the shaft 65. It will be appreciated that it is desirable to keep the shaft 65, and its associated assembly 70, always in the same orientation with respect to the pipe supporting portion 34 and any pipe supported therein. This will ensure that the T-fitting is always placed properly on the pipe. As seen in FIGS. 1 and 2 the shaft 65 has a longitudinal groove 181 which extends from a location close to the upper end of the shaft 65 to an annular recess 176 (see FIG. 1). Affixed by welding or otherwise to the top of the member 20 is an upstanding bracket 183 which support a spring plunger 185 which has a screw head to allow it to be screwed into a suitable tapped bore in the bracket 183. The "button" 187 of the spring plunger rides in the groove 181, and prevents the shaft 65 from rotating. When it is desired to lock the shaft in its uppermost position, with the assembly 70 raised as high as possible, handle 155 is simply lifted to its uppermost location which will bring the annular galery 167 into registry with the button 187. The annular recess 176 is deeper than the groove 181, and therefore the entry of the button 187 into the annular galary 176 will tend to hold the shaft 65 in its topmost location.

The apparatus is used as follows:

The main line is first excavated and exposed. Depending on the diameter of the main line, a set of inserts 37, 40 may be required to be placed in the pipe supporting portion 34 of the apparatus. The apparatus is then fastened around the main line, and an appropriate T-fitting is inserted in the T holder 110. This would be accomplished with the shaft 65 in its uppermost position, and the button 187 registering in the annular galery 176.

The appropriately shaped face is then secured to the heating iron (a conventional procedure), and the heating iron is heated to the proper temperature. A typical heating iron will have an adjustable thermostat to ensure that proper temperature is maintained.

With one hand the iron is positioned within the apparatus so that it is located on top of the thermoplastic main line, and is set into registry with the guide 140. With the other hand, the handle 155 is brought down until the pin 153 indicates that the proper pressure has been applied. This brings the flange 200 of the T-fitting into contact with the uppermost surface of the iron. The user simply applies downward pressure on the handle 155 until the appropriate mark on the side of the pin 143 becomes visible above the top surface of the carriage 14. This degree of pressure is maintained manually until the correct melt has been achieved on the main line and on the T-fitting.

When the proper degree of melt has been achieved, the handle 155 is lifted, and the heating iron is removed with the other hand. Immediately, the handle 155 is depressed to bring the T-fitting down against the main pipe line, and the handle is pushed down until the toggle links 148 and 160 lock in the "over dead center" position as previously defined, with the finger 165 bearing against the upper toggle link 160. Since the spring constant of the spring 106 is known, and since the length of the upper toggle link 160 can be adjusted, a very precise degree of downward pressure against any given size of the T-fitting can be ensured.

After the fused material has cooled and sealed together, the T-fitting is unfastened from the T holder 110 by unscrewing the locking nut 130, whereupon the handle 155 is raised to its lock position with the carriage 114 in the uppermost location. The pipe clamp is then undone and is removed from the main line.

While one embodiment of this invention has been illustrated in the drawings and described in the foregoing disclosure, it will be apparent to those skilled in the art that modifications and changes may be made therein without departing from the essence of the invention as set forth in the appended claims.

We claim:

1. An apparatus for clamping a plastic fitting against a plastic pipe and for holding them together with a predetermined clamping force, comprising:
    a carriage,
    guide means for guiding the carriage in vertical motion,
    a fixed pipe support portion below the carriage,
    a frame portion fixed with respect to said pipe support portion,
    a first toggle link pivoted to the carriage at a first axis,
    a second toggle link pivoted to said frame portion at a second axis, the two toggle links being pivoted to each other at a third axis,
    first means to prevent the toggle links from going significantly past a dead center position in which the three axes are aligned in an approximately vertical direction, and the carriage is in its lowermost position,
    second means connected to the carriage for holding said plastic fitting,
    and lever means for rotating one of said toggle links, the lever means including a lever fixed with respect to said first toggle link and extending at an angle with respect to the first toggle link, so that when the three axes are in alignment the lever extends in a generally sidewards direction.

2. The invention claimed in claim 1, in which the frame portion is located above the carriage.

3. The invention claimed in claim 2, in which said lever extends at an obtuse angle with respect to said first toggle link.

4. The invention claimed in claim 2, in which said first means includes a finger extending from one toggle link alongside the other toggle link, the finger being in mechanical interference with said other toggle link when the links seek to rotate more than a small distance past said dead center position.

5. The invention claimed in claim 2, in which the guide means includes two vertical cylindrical rods in spaced-apart relation fixed with respect to the pipe support portion, the rods supporting the said frame portion near their upper ends, the carriage having cylindrical slide means through which the rods pass, whereby the carriage can slide vertically therealong.

6. The invention claimed in claim 5, in which said second means includes a vertical guide shaft slideable within a guideway in the carriage, the shaft projecting upwardly through a guideway in said frame portion, the shaft having at its lower end means for connection to a holder for the plastic fitting.

7. The invention claimed in claim 6 in which the means for connection to a holder is self-leveling.

8. The invention claimed in claim 6, in which the guide shaft has a detent means for limiting its downward movement with respect to the carriage, and in which resilient means biases the guide shaft to its lowermost position with respect to the carriage.

* * * * *